US007763559B2

(12) United States Patent
Kurachi et al.

(10) Patent No.: US 7,763,559 B2
(45) Date of Patent: Jul. 27, 2010

(54) GLASS SUBSTRATE FOR DISPLAY AND DISPLAY

(75) Inventors: Junji Kurachi, Kanagawa (JP); Akihiro Koyama, Tokyo (JP); Yoichi Hachitani, Tokyo (JP)

(73) Assignees: Avanstrate Inc., Yokkaichi-shi, Mie (JP); Hoya Corporation, Tokyo (JP)

( * ) Notice: Subject to any disclaimer, the term of this patent is extended or adjusted under 35 U.S.C. 154(b) by 345 days.

(21) Appl. No.: 12/071,063

(22) Filed: Feb. 14, 2008

(65) Prior Publication Data
US 2008/0206494 A1 Aug. 28, 2008

(30) Foreign Application Priority Data

| Feb. 27, 2007 | (JP) | 2007-046422 |
| Jan. 29, 2008 | (JP) | 2008-017803 |
| Feb. 6, 2008  | (JP) | 2008-026871 |

(51) Int. Cl.
C03C 3/091 (2006.01)
C03C 3/093 (2006.01)

(52) U.S. Cl. ......................... 501/66; 501/67

(58) Field of Classification Search ............ 501/66, 501/67
See application file for complete search history.

(56) References Cited

U.S. PATENT DOCUMENTS

| 6,309,990 | B2 * | 10/2001 | Tamura et al. ........ 501/35 |
| 7,491,668 | B2 * | 2/2009 | Fechner et al. ........ 501/66 |
| 2004/0266603 | A1 * | 12/2004 | Fechner et al. ........ 501/66 |
| 2005/0028559 | A1 | 2/2005 | Hiromatsu et al. |
| 2008/0090717 | A1 | 4/2008 | Nagashima et al. |
| 2009/0141478 | A1 * | 6/2009 | Niguma et al. ........ 362/97.1 |
| 2009/0143214 | A1 * | 6/2009 | Niida et al. ........ 501/56 |
| 2009/0201664 | A1 * | 8/2009 | Motoya et al. ........ 362/97.1 |

FOREIGN PATENT DOCUMENTS

| EP | 1653499 A1 * | 5/2006 |
| EP | 1 790 620 B1 | 11/2007 |
| JP | 10-59741 | 3/1998 |
| JP | 2002-201040 | 7/2002 |
| JP | 2002201040 A * | 7/2002 |
| JP | 2003-238174 | 8/2003 |
| JP | 2004359542 A * | 12/2004 |
| JP | 2005-89259 | 4/2005 |
| JP | 2005-306719 | 11/2005 |
| JP | 2006-265001 | 10/2006 |
| WO | WO 2005015606 A1 * | 2/2005 |
| WO | WO 2006/064878 A1 | 6/2006 |
| WO | WO 2006064878 A1 * | 6/2006 |
| WO | WO 2006106659 A1 * | 10/2006 |
| WO | WO 2006106660 A1 * | 10/2006 |
| WO | WO 2007/020824 A1 | 2/2007 |
| WO | WO 2007/020825 A1 | 2/2007 |

OTHER PUBLICATIONS

Derwent Abstract 2003-375485 of JP2002201040A Jul. 16, 2002.*
Derwent Abstract of WO 2007-020825 A1 Feb. 22, 2007.*
Derwent Abstract 2005-222787 of EP 1 553 499 A1 May 3, 2003.*
Derwent Abstract 2005-060881 of JP2004359542A Dec. 24, 2004.*
Derwent Abstract 2006-781391 of WO 2006 106660 A1 Oct. 12, 2006.*
Derwent Abstract 2006-797848 of WO 2006106659A1 Oct. 12, 2006.*

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

A glass substrate for a display, which is formed of a glass having a light weight and having high refinability with decreasing environmental burdens, the glass comprising, by mass %, 50 to 70% of $SiO_2$, 5 to 18% of $B_2O_3$, 10 to 25% of $Al_2O_3$, 0 to 10% of MgO, 0 to 20% of CaO, 0 to 20% of SrO, 0 to 10% of BaO, 5 to 20% of RO (in which R is at least one member selected from the group consisting of Mg, Ca, Sr and Ba), and over 0.20% but not more than 2.0% of $R'_2O$ (in which R' is at least one member selected from the group consisting of Li, Na and K), and containing, by mass %, 0.05 to 1.5% of oxide of metal that changes in valence number in a molten glass, and substantially containing none of $As_2O_3$, $Sb_2O_3$ and PbO.

14 Claims, No Drawings

GLASS SUBSTRATE FOR DISPLAY AND DISPLAY

FIELD OF THE INVENTION

The present invention relates to a glass substrate for a display and a display.

More specifically, the present invention relates to a glass substrate for a display for use in a liquid crystal display (LCD), an electroluminescence display (ELD), a field emission display (FED), etc., and a display using the above glass substrate.

TECHNICAL BACKGROUND

When a glass containing an alkali component is used as a glass substrate constituting a thin film transistor drive color liquid crystal display (TFT-LCD), an alkali ion in the glass substrate is eluted to deteriorate TFT properties, or the glass substrate may be broken during heat treatment since the thermal expansion coefficient of the glass increases. As a glass substrate for TFT-LCD, therefore, it is general practice to use an alkali-free glass containing no alkali component (for example, see JP10-59741A).

Meanwhile, in recent years, displays including a liquid crystal display are steadily growing in size, and in glass substrates for use in the displays, for example, it has come to be accordingly required to decrease the amount of residual bubbles in the glass substrates or decrease the weight of the glass substrates.

In the production process of a glass substrate, removing bubbles, etc. in a glass substrate is referred to as refining treatment, and the refining treatment is generally carried out by adding a refining agent to a glass melt. In particular, arsenic oxide, antimony oxide, etc., are suitably used as a refining agent for glass substrates for liquid crystal displays. When a glass reaches a high temperature from a low temperature, these refining agents cause a reaction of $MO_x \rightarrow MO_y + z\ O_2 \uparrow$ involving a change in the valence of a metal constituting the refining agent, and oxygen generated in the above reaction enlarges bubbles that are caught in a glass melt and causes the bubbles to float upward to remove them.

Since, however, the above arsenic oxide, antimony oxide, etc., which are known to have high refining effects, are matters of concern regarding environmental damages, it is socially called for to decrease their use and discharge amounts.

Therefore, JP10-59741A has come to report a method of removing bubbles by incorporating 0.05 to 2% of $SnO_2$ into an alkali-free aluminoborosilicate glass without using any arsenic oxide.

DISCLOSURE OF THE INVENTION

Problems to be Solved by the Invention

When the present inventors have made diligent studies, it has been found that since an alkali-free aluminoborosilicate glass for use in an active matrix type liquid crystal display has a high viscosity, the refining method described in JP10-59741A has difficulties in carrying out full refining treatment.

Further, when the present inventors have made diligent studies more, it has been found that with a decrease in the density of a glass for decreasing the weight of a glass substrate, the refining of a molten glass faces more difficulties.

That is, generally, the method of replacing alkaline earth metal oxides having large mass numbers such as barium oxide, strontium oxide, etc., with an alkaline earth metal oxides having small mass numbers such as magnesium oxide, calcium oxide, etc., or with network-forming oxides such as boron oxide, aluminum oxide, silicon oxide, etc., is effective for decreasing the density of a glass. According to the present inventors' studies, however, it has been found that the replacement with these oxides decreases the refining effect produced by oxides of metals that change in valence number in a molten glass such as $SnO_2$, etc. It is assumed that the above is caused not only by an increase in viscosity due to an increase in the amount of network-forming oxides, but also by a decrease in the basicity and oxidation degree of the glass due to the above replacement.

As described above, the refining effect by an oxide of a metal that changes in valence number is exhibited since the metal having a high oxidation number in a glass melt that was prepared after initial melting, changes in valence number from high to low with an increase in temperature and releases oxygen during the change. For producing the above effect, therefore, the oxide of the metal that changes in valence number is required to maintain a fully oxidized state at a period during which a glass raw material finishes with initial melting and forms a glass melt.

However, an oxide of a metal that changes in valence number has the property of being more easily oxidized with an increase in the basicity of a glass (that is, being less oxidized with a decrease in the basicity of a glass and being easily decreased in valence number).

In a molten glass having decreased contents of components such as barium oxide, strontium oxide, etc., and larger contents of components having lower basicity such as calcium oxide, magnesium oxide, etc., for decreasing its weight, and in a molten glass having increased contents of acidic or neutral boron oxide, aluminum oxide, silicon oxide, etc., no sufficient refinability can be obtained since such glasses have decreased basicity and bring about a difficulty in maintaining the valence number of the metal that changes in valence number.

For promoting the oxidation, and inhibiting the reduction, of the oxide of a metal that changes in valence number, it is thinkable to use an oxidizing substance as a raw material for the glass, or specifically, a nitrate of an alkaline earth metal may be used as part of the raw material. However, concerning nitrates of alkaline earth metals, for example, while the decomposition temperature of strontium nitrate is 1,100° C., that of magnesium nitrate is 400° C., and with a smaller mass number of the metal element in the nitrate, the decomposition temperature thereof is lower. In glasses containing magnesium nitrate or calcium nitrate mainly as nitrates, they lose the oxidizing capability at a very beginning stage of melting glass raw materials. Moreover, nitrates of calcium and magnesium in particular easily deliquesce as compared with nitrates of barium and strontium, and industrially easily available hydrates thereof easily undergo liquefaction at a temperature of 100° C. or lower. When a large amount thereof is added to a glass raw material, therefore, they are liable to cause the solidification of the raw material, adherence thereof to equipment, etc., in a carrier line, and stable operation is difficult.

Regarding conventional substrate for a display, which is formed of a borosilicate glass, there is a problem that it is very difficult to obtain a borosilicate glass having a decreased weight and having high refinability while decreasing environmental burdens.

Under the circumstances, it is an object of the present invention to provide a glass substrate for a display, which has a decreased weight and has high refinability while decreasing environmental burdens and a display using this glass substrate.

Means to Solve the Problems

For achieving the above object, the present inventors have made diligent studies, and it has been found that the above object can be achieved by a glass substrate for a display, which is formed of an aluminoborosilicate glass comprising predetermined contents of $SiO_2$, $B_2O_3$, $Al_2O_3$, RO (in which R is at least one member selected from the group consisting of Mg, Ca, Sr and Ba) and $R_2'O$ (in which R' is at least one member selected from the group consisting of Li, Na and K), containing an oxide of a metal that changes in valence number in a molten glass and substantially containing none of $As_2O_3$, $Sb_2O_3$ and PbO. The present invention has been accordingly completed on the basis of the above finding.

That is, the present invention provides (1) a glass substrate for a display, which is formed of a glass comprising, by mass %,
50 to 70% of $SiO_2$,
5 to 18% of $B_2O_3$,
10 to 25% of $Al_2O_3$,
0 to 10% of MgO,
0 to 20% of CaO,
0 to 20% of SrO,
0 to 10% of BaO,
5 to 20% of RO (in which R is at least one member selected from the group consisting of Mg, Ca, Sr and Ba), and over 0.20% but not more than 2.0% of $R'_2O$ (in which R' is at least one member selected from the group consisting of Li, Na and K),
the glass containing, by mass %, 0.05 to 1.5% of an oxide of a metal that changes in valence number in a molten glass, and
substantially containing none of $As_2O_3$, $Sb_2O_3$ and PbO, (2) a glass substrate for a display as recited in the above (1), wherein the glass comprises, by mass %,
55 to 65% of $SiO_2$,
10 to 14% of $B_2O_3$,
15 to 19% of $Al_2O_3$,
1 to 3% of MgO,
4 to 7% of CaO,
1 to 4% of SrO,
0 to 2% of BaO,
6 to 16% of RO (in which R is at least one member selected from the group consisting of Mg, Ca, Sr and Ba), and over 0.20% but not more than 2.0% of $R'_2O$ (in which R' is at least one member selected from the group consisting of Li, Na and K),
the glass containing, by mass %, of 0.1 to 1.5% of an oxide of a metal that changes in valence number in a molten glass, and
substantially containing none of $As_2O_3$, $Sb_2O_3$ and PbO, (3) a glass substrate for a display as recited in the above (1) or (2), wherein the content of $R_2'O$ is over 0.20% but not more than 0.5%, (4) a glass substrate for a display as recited in any one of the above (1) to (3), wherein the glass contains $K_2O$ as $R'_2O$ and substantially contains none of $Li_2O$ and $Na_2O$, (5) a glass substrate for a display as recited in any one of the above (1) to (4), wherein the glass contains, as an oxide of a metal that changes in valence number in a molten glass, at least one member selected from the group consisting of tin oxide, iron oxide and cerium oxide, (6) a glass substrate for a display as recited in the above (5), wherein the glass has a tin oxide content in the range of 0.01 to 0.5%, (7) a glass substrate for a display as recited in the above (5) or (6), wherein the glass has an iron oxide content in the range of 0.05 to 0.2%, (8) a glass substrate for a display as recited in any one of the above (5) to (7), wherein the glass has a cerium oxide content in the range of 0 to 1.2%, (9) a glass substrate for a display as recited in any one of the above (1) to (8), wherein a content of sulfur oxide in the glass is limited to, as $SO_3$, 0 mass % or more but less than 0.010 mass %,

(10) a glass substrate for a display as recited in any one of the above (1) to (9), wherein a content of whole halide ion in the glass is limited to 0 mass % or more but less than 0.05 mass %,

(11) a glass substrate for a display as recited in any one of the above (1) to (10), wherein the glass has a density of 2.49 g/cm$^3$ or less,

(12) a glass substrate for a display as recited in any one of the above (1) to (11), wherein the glass has a linear thermal expansion coefficient of $28 \times 10^{-7}$/° C. to $39 \times 10^{-7}$ at a temperature between 50° C. and 300° C.,

(13) a display having a glass substrate for a display as recited in any one of the above (1) to (12), and

(14) a display of the above (13), which is a liquid crystal display.

EFFECT OF THE INVENTION

Using a specific aluminoborosilicate glass having a specific composition comprising an alkali metal oxide and an oxide of a metal that changes in valence number in a molten glass and substantially containing none of $As_2O_3$, $Sb_2O_3$ and PbO, the present invention can provide a glass substrate for a display, which is light in weight and has high refinability while decreasing environmental burdens and can also provide a display using the above glass substrate.

PREFERRED EMBODIMENTS OF THE INVENTION

First, the glass substrate for a display, provided by the present invention, will be explained.

The glass substrate for a display, provided by the present invention, is formed of a glass comprising, by mass %,
50 to 70% of $SiO_2$,
5 to 18% of $B_2O_3$,
10 to 25% of $Al_2O_3$,
0 to 10% of MgO,
0 to 20% of CaO,
0 to 20% of SrO,
0 to 10% of BaO,
5 to 20% of RO (in which R is at least one member selected from the group consisting of Mg, Ca, Sr and Ba), and over 0.20% but not more than 2.0% of $R'_2O$ (in which R' is at least one member selected from the group consisting of Li, Na and K),
containing, by mass %, 0.05 to 1.5% of an oxide of a metal that changes in valence number in a molten glass, and
substantially containing none of $As_2O_3$, $Sb_2O_3$ and PbO, The composition of the glass for constituting the glass substrate for a display in the present invention will be explained below, while % stands for mass % unless otherwise specified.

$SiO_2$ is an essential component for forming the network of the glass, and has an effect that the glass is improved in chemical durability and heat resistance. When the content of $SiO_2$ is less than 50%, the effect thereof is not sufficiently produced. When it exceeds 70%, the glass is liable to devitrify and the molding of the glass is difficult. Further, the viscosity of the glass increases, and the homogenization of the glass is difficult. The content of $SiO_2$ is therefore 50 to 70%, and it is preferably 55 to 65%, more preferably 57 to 62%.

$B_2O_3$ is an essential component for decreasing the viscosity of the glass and hence promoting the melting and refining of the glass. When the content of $B_2O_3$ is less than 5%, the effect thereof is not sufficiently obtained. When it exceeds 18%, the acid resistance of the glass decreases and since the volatilization of the glass increases, the homozenization of the glass is difficult. The content of $B_2O_3$ is therefore 5 to 18%, and it is preferably 10 to 14%, more preferably 11 to 13%.

$Al_2O_3$ is an essential component for forming the glass network and has an effect that the glass is improved in chemical durability and heat resistance. When the content of $Al_2O_3$ is less than 10%, the effect thereof is not sufficiently obtained. When it exceeds 25%, the viscosity of the glass increases and hence it is difficult to melt the glass. Further, the acid resistance thereof decreases. The content of $Al_2O_3$ is therefore 10 to 25%, and it is preferably 15 to 19%, more preferably 16 to 18%.

MgO and CaO are optional components for decreasing the viscosity of the glass and promoting the melting and refining of the glass. Further, since Mg and Ca among alkaline earth metals increase the density of the glass to less extent, they are advantageous for decreasing the weight of the glass and at the same time improving the meltability of the glass. When the contents of MgO and CaO exceed 10% and 20%, respectively, the chemical durability of the glass is degraded. The content of MgO is therefore 0 to 10%, and it is preferably 0.5 to 4%, more preferably 1 to 3%. The content of CaO is therefore 0 to 20%, and it is preferably 4 to 7%, more preferably 5 to 7%.

SrO and BaO are optional components for decreasing the viscosity of the glass and promoting the melting and refining of the glass. They are also components that improve the oxidizability of the glass raw material and hence improve the refinability of the glass. When the contents of SrO and BaO exceeds 20% and 10%, respectively, the chemical durability of the glass are degraded. The content of SrO is therefore 0 to 20%, and it is preferably 1 to 4%, more preferably 2 to 3%. The content of BaO is therefore 0 to 10%, and it is preferably 0 to 6.5%, more preferably 0 to 2%, still more preferably 0.5 to 1%.

When the content of RO (in which R is at least one member selected from the group consisting of Mg, Ca, Sr and Ba) is less than 5%, the viscosity of the glass increases and the melting of the glass is hence difficult. When it exceeds 20%, the chemical durability of the glass decreases. The content of RO, as a total content of MgO, CaO, SrO and BaO), is therefore 5 to 20%, and it is preferably 5 to 16%, more preferably 8 to 13%.

In particular, for obtaining a substrate having a light weight, the glass preferably contains 1 to 3% of MgO, 4 to 7% of CaO, 1 to 4% of SrO, 0 to 2% of BaO and has an RO content of 6 to 16%.

$Li_2O$, $Na_2O$ and $K_2O$ are components that may be eluted from the glass to deteriorate the properties of TFT or that may increase the thermal expansion coefficient of the glass to break the substrate during heat treatment, so that they have not been much used as components for constituting a glass substrate for a display. In the glass substrate of the present invention, the glass positively contains a specific amount of the above alkali components since the alkali components increase the basicity of the glass and facilitate the oxidation of a metal that changes in valence number, and as the result, excellent refinability is hence achieved while preventing the deterioration of the TFT properties and controlling the thermal expansion of the glass in a predetermined range. When the total content of $Li_2O$, $Na_2O$ and $K_2O$ represented by $R'_2O$ (in which R' is at least one member selected from the group consisting of Li, Na and K) is less than 0.20%, the above refining effect cannot be obtained. When the above total content exceeds 2.0%, these components are liable to be eluted after the substrate is incorporated into a display, and the possibility of their corroding a liquid crystal and an electrically conductive film increases. Therefore, the content of $R'_2O$ is 0.20% or more but not more than 2.0%. For attaining a thermal expansion coefficient suitable for a substrate for a liquid crystal display, the content of $R'_2O$ is preferably 0.20% or more but not more than 0.5%, more preferably at least 0.22% but not more than 0.35%.

In the glass substrate of the present invention, preferably, the glass contains $K_2O$ as $R'_2O$ and substantially contains none of $Li_2O$ and $Na_2O$. That is, the glass preferably contains only $K_2O$ out of $Li_2O$, $Na_2O$ and $K_2O$ as $R'_2O$.

The reason therefor is that, of $Li_2O$, $Na_2O$ and $K_2O$, $K_2O$ having high basicity is the most excellent in the effect of refining improvement. Further, alkali metal oxides are liable to bond to $B_2O_3$ to volatilize as alkali borates, and in particular, $Li^+$ and $Na^+$ having small ionic radii have high mobility in a glass melt and are liable to volatilize from the melt surface, so that they are liable to form a concentration gradient inside the glass to generate striae on the glass surface. In contrast, $K^+$ has a large ionic radius and hence has low mobility in a glass melt, so that it does not much cause the above problems. In view of this point, it can be also said that it is preferred to use the glass containing only $K_2O$ out of $Li_2O$, $Na_2O$ and $K_2O$.

The oxide of the metal that changes in valence number in a molten glass is an essential component for the refining of the glass. When the content thereof is less than 0.05%, the effect thereof is not obtained. When it exceeds 1.5%, devitrification and coloring are caused. The content of the oxide of the metal is therefore 0.05 to 1.5%. It is preferably 0.1 to 1.5%, more preferably 0.1 to 1%, still more preferably 0.1 to 0.5%. When a plurality of oxides of metals that change in valence number in a molten glass are used, similarly, the total content thereof is 0.05 to 1.5%, and it is preferably 0.1 to 1.5%, more preferably 0.1 to 1%, still more preferably 0.1 to 0.5%.

The oxide of the metal that changes in valence number in a molten glass is not specially limited so long as its environmental burdens are small and so long as it is excellent in refinability of the glass. For example, it includes metal oxides such as tin oxide, iron oxide, cerium oxide, terbium oxide, molybdenum oxide and tungsten oxide, and these metal oxides may be used singly or in combination. Of the above metal oxides, tin oxide, iron oxide and cerium oxide are less harmful and exhibit an excellent refining effect in the co-presence of an alkali metal oxide such as $Li_2O$, $Na_2O$ or $K_2O$, and it is hence preferred to use at least one member selected from these tin oxide, iron oxide and cerium oxide.

However, tin oxide is a component that makes a glass easily devitrifiable. For preventing the occurrence of the devitrification while improving the glass in refinability, therefore, the content of tin oxide is preferably 0.01 to 0.5%, more preferably 0.05 to 0.3%, still more preferably 0.1 to 0.2%.

Further, iron oxide is a component that colors the glass. For attaining a transmittance suitable for a display while improving the refinability, therefore, the content of iron oxide is preferably 0.05 to 0.2%, more preferably 0.05 to 0.15%, still more preferably 0.05 to 0.10%.

The content of cerium oxide is preferably 0 to 1.2%, more preferably 0.01 to 1.2%, still more preferably 0.05 to 1.0%, particularly preferably 0.3 to 1.0%.

In addition to the above components, the glass for the glass substrate of the present invention may contain other components such as zinc, phosphorus, etc., up to their total content of 0.5% for adjusting its properties.

$SO_3$ derived from sulfate, etc., is also a component that changes in valence number in a molten glass, and it causes a reaction of $SO_3 \rightarrow SO_2 + \frac{1}{2}O_2$ in a molten glass. $SO_2$ remaining after the release of oxygen has very small solubility in a glass melt having low basicity, and $SO_2$ contained in a refined glass melt can possibly gasify due to slight stimuli such as slight change in temperature, contact to a vessel wall, etc., and can be a new source to generate bubbles. In the glass substrate of the present invention, therefore, it is preferred to impose a limitation that the glass does not contain any one of $SO_3$ and $SO_2$. In particular, when glass substrates are produced from a molten glass by a continuous production method using $SnO_2$ as an oxide of a metal that changes in valence number in a molten glass, bubbles containing a large amount of $SO_2$ are liable to be generated. The reason therefor is assumed to be as follows. $SnO_2$ generates $O_2$ during the refining step to form SnO, and this SnO works as a strong reducing agent in the process of cooling a glass melt to a temperature suitable for molding (shaping), and it reduces $SO_3$ in the glass to $SO_2$. The bubbles generated at this stage are not removed from the glass melt since the viscosity of the glass melt is not so sufficiently low as to cause the bubbles to float off, and they are liable to remain in the glass substrate. It is therefore preferred to impose on the glass for constituting the glass substrate of the present invention a limitation that the glass does not contain any one of $SO_3$ and $SO_2$ except for a case where it contains them as impurities. In the production of the glass, it is also preferred to preclude from a raw material batch any sulfate that constitutes $SO_3$ and $SO_2$ sources. Specifically, the content of a sulfur oxide, as $SO_3$, in the glass for constituting the glass substrate is preferably less than 0.010%, more preferably 0.005% or less, still more preferably 0.003% or less.

$As_2O_3$, $Sb_2O_3$ and PbO are substances that cause a reaction involving a change in valence number in a molten glass and have a glass-refining effect. Since, however, they are substances involving large environmental burden, the glass substrate of the present invention has a limitation that the glass therefor substantially does not contain any one of $As_2O_3$, $Sb_2O_3$ and PbO. In the present specification, that a glass substantially contains none of $As_2O_3$, $Sb_2O_3$ and PbO means that the total content of $As_2O_3$, $Sb_2O_3$ and PbO in the glass is 0.1% or less.

When glass substrates are produced from a molten glass by a continuous production method using a glass containing a halide ion such as fluoride ion, chloride ion or the like, a glass melt comes in contact with a vessel and a stirrer made of platinum each in a furnace to cause the generation of bubbles. It is assumed that the above is caused since a halide ion decreases the wettability between the glass and the platinum to make it easier to form bubbles of the above $SO_2$ in the interface between the platinum and the glass. In the glass for the glass substrate of the present invention, therefore, it is preferred to introduce a limitation that the glass contains no halide ions except for a case where they are contained as impurities. For this purpose, preferably, halides are removed from a raw material batch in the production of the glass. Specifically, the total content of halide ions in the glass for the glass substrate is preferably less than 0.05%, more preferably 0.03% or less, more preferably 0.01% or less.

The density of the glass for the glass substrate of the present invention is preferably 2.49 $g/cm^3$ or less, more preferably 2.46 $g/cm^3$ or less, still more preferably 2.43 $g/cm^3$ or less.

Further, the linear thermal expansion coefficient of the glass for the glass substrate of the present invention at a temperature between 50° C. and 300° C. is preferably $28 \times 10^{-7}$ to $39 \times 10^{-7}$/° C., more preferably $28 \times 10^{-7}$ to $37 \times 10^{-7}$/° C., still more preferably $30 \times 10^{-7}$ to $35 \times 10^{-7}$/° C.

The glass substrate of the present invention can be obtained, for example, by weighing and mixing raw materials corresponding to the above components, supplying the mixture to a melting vessel made of a platinum alloy and heating, melting, refining and homogenizing it to prepare a glass having a desired composition and then processing or finishing the glass in the form of a thin plate according to a down draw method, a floating method, a fusion method, a roll out method, or the like.

The display of the present invention will be explained below.

The display of the present invention characteristically has the glass substrate for a display, provided by the present invention.

The display includes a liquid crystal display (LCD), an electroluminescence display (ELD), a field emission display (FED), etc., and a liquid crystal display (LCD) is a typical example.

EXAMPLES

The present invention will be explained more in detail with reference to Examples hereinafter, while the present invention shall not be limited by these Examples.

Examples 1-19 and Comparative Examples 1-2

Production Examples of Glass Substrate by a Batch Method

1. Preparation of Glass

In order to obtain glass compositions of Examples 1-19 and Comparative Examples 1-2 shown in Table 1 and 2, first, glass raw material batches (to be referred to as "batch" hereinafter) were prepared from purified quartz sand, boron oxide, alumina, basic magnesium carbonate, calcium carbonate, strontium nitrate, barium nitrate, potassium carbonate, sodium carbonate and lithium carbonate which are conventional industrial glass raw materials. In addition, Comparative Example 2 used ammonium chloride as a raw material for Cl and plaster dihydrate as a raw material for $SO_3$.

Each of above-prepared batches was melted and refined in a platinum crucible. That is, the crucible with the batch in it was maintained for 2 hours in an electric furnace set at 1,550° C. to roughly melt the batch, and then the crucible was transferred into an electric furnace set at 1,620° C. to increase the temperature of a glass melt, whereby the glass melt was refined.

The crucible was taken out of the furnace and allowed to cool to solidness in room temperature to give a glass material. The glass material was taken out of the crucible and gradually cooled. The gradual cooling was carried out as follows. The glass material was maintained for 30 minutes in other electric furnace set at 800° C., and the power source of the electric furnace was turned off to cool the glass material to room temperature. The glass material that was so gradually cooled was used as a sample glass.

Each of sample glasses obtained in the above manner was measured for a density, a thermal expansion coefficient, and a glass transition temperature, and bubbles in each sample glass were counted. Tables 1 and 2 show the results. The following methods were used for measuring the thermal expansion coefficient α and the glass transition temperature Tg and counting bubbles.

(Measurements of Thermal Expansion Coefficient α and Glass Transition Temperature Tg)

Columnar glass test pieces having a diameter of 5 mm and a length of 18 mm each were prepared from the above sample glasses by a general glass processing technique, and they were measured for thermal expansion coefficients α at a temperature between 50° C. and 300° C. and glass transition temperatures Tg with a differential thermal dilatometer (Thermoflex TMA8140, supplied by Rigaku Corporation).

(Counting of Bubbles (Evaluation for Refinability))

Each of the above sample glasses was observed through an optical microscope of 20 magnifications and the number of remaining bubbles was counted. However, bubbles of a portion in contact with the crucible side were excluded from the counting.

Since the above sample glasses were obtained by simple melting procedures using the crucible, the state of bubbles may be somewhat deviated from the state of bubbles that are generated in an actual production line. However, the above results are fully useful as an index for refinability.

2. Production of Glass Substrate

The above sample glasses were processed into thin plates having a thickness of 0.6 mm each by a down draw method to give glass substrates for a display.

TABLE 1

| | Unit | Example 1 | 2 | 3 | 4 | 5 | 6 | 7 | 8 | 9 | 10 |
|---|---|---|---|---|---|---|---|---|---|---|---|
| $SiO_2$ | mass % | 60.9 | 60.2 | 60.2 | 59.6 | 60.0 | 59.7 | 59.4 | 60.3 | 62.8 | 62.2 |
| $B_2O_3$ | mass % | 11.6 | 11.5 | 12.4 | 12.8 | 12.3 | 11.2 | 12.3 | 11.3 | 11.0 | 10.9 |
| $Al_2O_3$ | mass % | 16.9 | 16.7 | 16.8 | 16.6 | 15.9 | 17.4 | 16.6 | 16.7 | 16.0 | 15.8 |
| MgO | mass % | 1.7 | 1.7 | 1.7 | 1.1 | 1.7 | 1.7 | 1.7 | 1.7 | 1.9 | 1.9 |
| CaO | mass % | 5.1 | 5.0 | 5.3 | 5.3 | 5.3 | 5.3 | 5.3 | 5.3 | 6.0 | 5.0 |
| SrO | mass % | 2.6 | 2.6 | 2.3 | 2.2 | 2.3 | 2.2 | 2.2 | 2.2 | 1.8 | 3.5 |
| BaO | mass % | 0.7 | 0.6 | 0.9 | 2.0 | 2.0 | 2.0 | 2.0 | 2.0 | 0.0 | 0.0 |
| RO* | mass % | 10.1 | 10.0 | 10.2 | 10.6 | 11.3 | 11.2 | 11.3 | 11.3 | 9.7 | 10.5 |
| $Li_2O$ | mass % | 0.00 | 0.00 | 0.00 | 0.00 | 0.00 | 0.00 | 0.00 | 0.00 | 0.00 | 0.00 |
| $Na_2O$ | mass % | 0.00 | 0.00 | 0.00 | 0.00 | 0.00 | 0.00 | 0.00 | 0.00 | 0.00 | 0.00 |
| $K_2O$ | mass % | 0.25 | 1.40 | 0.20 | 0.20 | 0.20 | 0.20 | 0.20 | 0.20 | 0.25 | 0.25 |
| $R'_2O$** | Mass % | 0.25 | 1.40 | 0.20 | 0.20 | 0.20 | 0.20 | 0.20 | 0.20 | 0.25 | 0.25 |
| $Fe_2O_3$ | Mass % | 0.15 | 0.15 | 0.15 | 0.15 | 0.15 | 0.15 | 0.15 | 0.15 | 0.15 | 0.15 |
| $SnO_2$ | Mass % | 0.13 | 0.13 | 0.13 | 0.13 | 0.13 | 0.13 | 0.13 | 0.13 | 0.13 | 0.13 |
| $CeO_2$ | Mass % | 0.00 | 0.00 | 0.00 | 0.00 | 0.00 | 0.00 | 0.00 | 0.00 | 0.00 | 0.00 |
| Cl | Mass % | 0.00 | 0.00 | 0.00 | 0.00 | 0.00 | 0.00 | 0.00 | 0.00 | 0.00 | 0.00 |
| $SO_3$ | Mass % | 0.00 | 0.00 | 0.00 | 0.00 | 0.00 | 0.00 | 0.00 | 0.00 | 0.00 | 0.00 |
| Density | g/cm$^3$ | 2.40 | 2.40 | 2.44 | 2.45 | 2.46 | 2.47 | 2.46 | 2.46 | 2.43 | 2.44 |
| A | ×10$^{-7}$/° C. | 33.3 | 36.0 | 32.4 | 33.0 | 34.9 | 34.3 | 35.8 | 35.1 | 30.5 | 33.2 |
| Tg | ° C. | 720 | 703 | 746 | 750 | 738 | 753 | 745 | 752 | 748 | 749 |
| NB | per cm$^3$ | 1.4 | 0.7 | 4.5 | 3.9 | 2.6 | 1.2 | 0.6 | 2.9 | 2.0 | 0.4 |

RO*: Total content of MgO, GaO, SrO and BaO
R'$_2$O**: Total content of Li2O, Na2O and K2O
α: Thermal expansion coefficient
Tg: Glass transition temperature
NB: Number of bubbles

TABLE 2

| | Unit | Example 11 | 12 | 13 | 14 | 15 | 16 | 17 | 18 | 19 | CEx. 1 | 2 |
|---|---|---|---|---|---|---|---|---|---|---|---|---|
| $SiO_2$ | mass % | 60.4 | 60.2 | 60.0 | 60.9 | 60.9 | 61.1 | 63.9 | 57.7 | 60.6 | 61.0 | 62.9 |
| $B_2O_3$ | mass % | 11.6 | 11.5 | 13.1 | 13.3 | 13.3 | 11.6 | 10.0 | 12.6 | 11.6 | 11.7 | 8.3 |
| $Al_2O_3$ | mass % | 16.9 | 16.7 | 16.8 | 17.0 | 14.7 | 16.8 | 15.0 | 18.7 | 16.8 | 16.9 | 16.7 |
| MgO | mass % | 1.7 | 1.7 | 0.8 | 1.7 | 1.7 | 1.1 | 1.9 | 1.1 | 1.7 | 1.7 | 1.4 |
| CaO | mass % | 5.5 | 5.0 | 5.5 | 5.6 | 5.6 | 5.5 | 5.0 | 5.2 | 5.1 | 5.1 | 6.1 |
| SrO | mass % | 2.6 | 2.6 | 2.6 | 0.3 | 2.7 | 2.6 | 3.6 | 2.2 | 2.6 | 2.7 | 3.4 |
| BaO | mass % | 0.7 | 0.6 | 0.6 | 0.7 | 0.7 | 0.6 | 0.0 | 2.0 | 0.7 | 0.6 | 0.0 |
| RO* | mass % | 10.5 | 10.0 | 9.6 | 8.3 | 10.6 | 9.9 | 10.5 | 10.5 | 10.1 | 10.1 | 10.9 |
| $Li_2O$ | mass % | 0.00 | 0.00 | 0.00 | 0.25 | 0.00 | 0.00 | 0.00 | 0.00 | 0.00 | 0.00 | 0.09 |
| $Na_2O$ | mass % | 0.00 | 0.00 | 0.25 | 0.00 | 0.00 | 0.00 | 0.00 | 0.00 | 0.00 | 0.00 | 0.09 |
| $K_2O$ | mass % | 0.25 | 1.40 | 0.00 | 0.00 | 0.25 | 0.25 | 0.25 | 0.20 | 0.25 | 0.00 | 0.00 |
| $R'_2O$** | mass % | 0.25 | 1.40 | 0.25 | 0.25 | 0.25 | 0.25 | 0.25 | 0.20 | 0.25 | 0.00 | 0.18 |

TABLE 2-continued

Table 2

|  | Unit | Example | | | | | | | | | CEx. | |
|---|---|---|---|---|---|---|---|---|---|---|---|---|
|  |  | 11 | 12 | 13 | 14 | 15 | 16 | 17 | 18 | 19 | 1 | 2 |
| $Fe_2O_3$ | mass % | 0.15 | 0.15 | 0.15 | 0.15 | 0.15 | 0.15 | 0.15 | 0.15 | 0.15 | 0.15 | 0.05 |
| $SnO_2$ | mass % | 0.13 | 0.13 | 0.13 | 0.13 | 0.13 | 0.13 | 0.13 | 0.13 | 0.13 | 0.13 | 0.30 |
| $CeO_2$ | mass % | 0.00 | 0.00 | 0.00 | 0.00 | 0.00 | 0.00 | 0.00 | 0.00 | 0.40 | 0.00 | 0.00 |
| Cl | mass % | 0.00 | 0.00 | 0.00 | 0.00 | 0.00 | 0.00 | 0.00 | 0.00 | 0.00 | 0.00 | 0.49 |
| $SO_3$ | mass % | 0.00 | 0.00 | 0.00 | 0.00 | 0.00 | 0.00 | 0.00 | 0.00 | 0.00 | 0.00 | 0.30 |
| Density | g/cm$^3$ | 2.42 | 2.40 | 2.39 | 2.37 | 2.40 | 2.40 | 2.44 | 2.45 | 2.41 | 2.41 |  |
| A | ×10$^{-7}$/° C. | 33.0 | 36.0 | 33.0 | 33.6 | 33.8 | 34.3 | 32.6 | 33.0 | 33.5 | 32.5 |  |
| Tg | ° C. | 712 | 703 | 703 | 702 | 719 | 692 | 764 | 748 | 718 | 718 |  |
| NB | per cm$^3$ | 1.2 | 1.4 | 4.9 | 4.5 | 1.2 | 1.4 | 2.4 | 0.7 | 1.0 | 7.9 | 6.3 |

RO*: Total content of MgO, CaO, SrO and BaO
R'$_2$O**: Total content of Li$_2$O, Na$_2$O and K$_2$O
α: Thermal expansion coefficient
Tg: Glass transition temperature
NB: Number of bubbles
CEx.: Comparative Example It is seen from Tables 1 and 2 that the glasses for glass substrates, obtained in Examples 1 to 19 have a small density of 2.37 to 2.47 g/cm$^3$ and can serve to decrease the weight of a glass substrate for displays. It is also seen that since the glasses have a low thermal expansion coefficient α of 32.4× 10$^{-7}$ to 36.0×10$^{-7}$/° C. and hence do not easily break during the heat treatment of glass substrates, displays can be produced at high yields. Further, it is seen that the glasses for glass substrates contain none of As$_2$O$_3$, Sb$_2$O$_3$ and PbO and can serve to decrease environmental burdens.

As shown in Tables 1 and 2, further, the glasses for glass substrates, obtained in Examples 1 to 19, have an Li$_2$O, Na$_2$O and K$_2$O total content of 0.20 to 1.40% and contain at least one member selected from the group consisting of tin oxide (SnO$_2$), iron oxide (Fe$_2$O$_3$) and cerium oxide (CeO$_2$) as an oxide of a metal that changes in valence number in a molten glass, and the number of bubbles in the glasses is 0.7 to 4.9/cm$^3$.

In contrast, the glass obtained in Comparative Example 1 does not contain any one of Li$_2$O, Na$_2$O and K$_2$O, and the number of bubbles therein is 7.9/cm$^3$. In particular, the glasses obtained in Examples 1 and 2 have nearly the same basic glass compositions as that of the glass obtained in Comparative Example 1 except for the content of K$_2$O. Since, however, the numbers of bubbles in the glasses obtained in Examples 1 and 2 are 1.4 and 0.7/cm$^2$, it is seen that the glasses have excellent refinability over the glass obtained in Comparative Example 1.

The glass obtained in Comparative Example 2 contains 0.30% of tin oxide (SnO$_2$) and 0.05% of iron oxide (Fe$_2$O$_3$), has an Li$_2$O, Na$_2$O and K$_2$O total content of 0.18% and further contains 0.49% of chloride ion (Cl) and 0.30% of SO$_3$, and the number of bubbles therein is 6.3/cm$^3$. When the glasses obtained in Examples 1 to 19 are compared with the glass obtained in Comparative Example 2, the number of bubbles in the glasses obtained in Examples 1 to 19 is 0.7 to 4.9/cm$^3$, and it is hence seen that the glasses obtained in Examples 1 to 19 have excellent refinability over the glass obtained in Comparative Example 2.

Examples 20-22

Production Examples of Glass Substrates by a Continuous Method

In each of Examples 20 to 22, in a continuous melting apparatus having a melting vessel made of refractory brick and an conditioning vessel made of platinum, a glass raw material that had been prepared so as to have a composition shown in Table 3 was melted at 1,580° C., refined at 1,650° C. and stirred at 1,500° C., and then a molten glass was processed in the form of a 0.6 mm thick thin plate by a down draw method to give glass substrates for a display. When raw materials were prepared, purified industrial raw materials whose sulfur content and chlorine content were small were provided. As a substitute for calcium carbonate, plaster dihydrate was added in Example 21, and calcium chloride was added in Example 22, to adjust SO$_3$ contents and Cl contents. SO$_3$ and Cl were chemically isolated from the other components by dissolving the produced glass substrate in hydrofluoric acid and quantitatively determined.

In glasses obtained in Examples 20 to 22 in the above manner, the number of bubbles in each glass was counted in the same manner as in Examples 1 to 19, and Table 3 shows the results.

TABLE 3

|  |  | Example | | |
|---|---|---|---|---|
|  | Unit | 20 | 21 | 22 |
| $SiO_2$ | mass % | 60.9 | 60.9 | 60.8 |
| $B_2O_3$ | mass % | 11.6 | 11.6 | 11.6 |
| $Al_2O_3$ | mass % | 16.9 | 16.9 | 16.9 |
| MgO | mass % | 1.7 | 1.7 | 1.7 |
| CaO | mass % | 5.1 | 5.1 | 5.1 |
| SrO | mass % | 2.6 | 2.6 | 2.6 |
| BaO | mass % | 0.7 | 0.7 | 0.7 |
| RO* | mass % | 10.1 | 10.1 | 10.1 |
| $Li_2O$ | mass % | 0.00 | 0.00 | 0.00 |
| $Na_2O$ | mass % | 0.03 | 0.03 | 0.03 |
| $K_2O$ | mass % | 0.25 | 0.25 | 0.25 |
| R'$_2$O** | mass % | 0.28 | 0.28 | 0.28 |

TABLE 3-continued

|  | Unit | Example 20 | Example 21 | Example 22 |
|---|---|---|---|---|
| $Fe_2O_3$ | mass % | 0.10 | 0.10 | 0.10 |
| $SnO_2$ | mass % | 0.13 | 0.13 | 0.13 |
| $CeO_2$ | mass % | 0.00 | 0.00 | 0.00 |
| Cl*** | mass % | <0.01 | <0.01 | 0.05 |
| $SO_3$ | mass % | 0.001 | 0.010 | 0.001 |
| NB | ×$10^{-6}$/$cm^3$ | 24 | 720 | 120 |

RO*: Total content of MgO, CaO, SrO and BaO
$R'_2O$**: Total content of $Li_2O$, $Na_2O$ and $K_2O$
Cl***: <0.01 mass % means the detection limit of a detector or lower.
NB: Number of bubbles As shown in Table 3, the number of bubbles in the glass for a glass substrate, obtained in Example 20, is 24×$10^{-6}$/$cm^3$, and the glass substrates in Example 20 hence exhibits a high bubble-free quality sufficiently suitable as a large-size substrate of the seventh-generation (1,870×2,200 mm) and thereafter. Further, although the glasses constituting the glass substrates obtained in Examples 21 and 22 contain 0.010% of $SO_3$ (Example 21) or 0.05% of Cl (Example 22), the number of bubbles is 720×$10^{-6}$/$cm^3$ or 120×$10^{-6}$/$cm^3$, so that the glass substrates in Examples 21 and 22 are fully feasible for practical use as a substrate of the sixth-generation (1,500×1,850 mm) or a substrate for smaller displays.

When a liquid crystal display module was prepared using the glass substrate obtained in the above Example 20 and tested, the module was without any problem when compared with a module using a conventional alkali-free glass, and it has been hence found that the glass substrate of the present invention can be used as a substitute for the conventional alkali-free glass substrate.

INDUSTRIAL UTILITY

The glass substrate for a display, provided by the present invention, has a light weight and has high refinability while decreasing environmental burdens. Therefore, it can be suitable used in displays such as TFT-LCD, and the like.

The invention claimed is:

1. A glass substrate for a display, which is formed of a glass comprising, by mass %,
   50 to 70% of $SiO_2$,
   5 to 18% of $B_2O_3$,
   10 to 25% of $Al_2O_3$,
   0 to 10% of MgO,
   0 to 20% of CaO,
   0 to 20% of SrO,
   0 to 10% of BaO,
   5 to 20% of RO (in which R is at least one member selected from the group consisting of Mg, Ca, Sr and Ba), and
   0.20% or more but not more than 2.0% of $R'_2O$ (in which R' is at least one member selected from the group consisting of Li, Na and K),
   the glass containing, by mass %, 0.05 to 1.5% of an oxide of a metal that changes in valence number in a molten glass, and
   substantially containing none of $As_2O_3$, $Sb_2O_3$ and PbO.

2. The glass substrate for a display as recited in claim 1, wherein the glass comprises, by mass %,
   55 to 65% of $SiO_2$,
   10 to 14% of $B_2O_3$,
   15 to 19% of $Al_2O_3$,
   1 to 3% of MgO,
   4 to 7% of CaO,
   1 to 4% of SrO,
   0 to 2% of BaO,
   6 to 16% of RO in which R is at least one member selected from the group consisting of Mg, Ca, Sr and Ba, and
   0.20% or more but not more than 2.0% of $R'_2O$ in which R' is at least one member selected from the group consisting of Li, Na and K,
   the glass containing, by mass %, of 0.1 to 1.5% of an oxide of a metal that changes in valence number in a molten glass, and
   substantially containing none of $As_2O_3$, $Sb_2O_3$ and PbO.

3. The glass substrate for a display as recited in claim 1, wherein the content of $R_2'O$ is 0.20% or more but not more than 0.5%.

4. The glass substrate for a display as recited in claim 1, wherein the glass contains $K_2O$ as $R'_2O$ and substantially contains none of $Li_2O$ and $Na_2O$.

5. The glass substrate for a display as recited in claim 1, wherein the glass contains at least one member selected from the group consisting of tin oxide, iron oxide and cerium oxide as an oxide of a metal that changes in valence number in a molten glass.

6. The glass substrate for a display as recited in claim 5, wherein the glass has a tin oxide content in the range of 0.01 to 0.5%.

7. The glass substrate for a display as recited in claim 5, wherein the glass has an iron oxide content in the range of 0.05 to 0.2%.

8. The glass substrate for a display as recited in claim 5, wherein the glass has a cerium oxide content in the range of 0 to 1.2%.

9. The glass substrate for a display as recited in claim 1, wherein a content of sulfur oxide in the glass is limited to, as $SO_3$, 0 mass % or more but less than 0.010 mass %.

10. The glass substrate for a display as recited in claim 1, wherein a content of whole halide ion in the glass is limited to 0 mass % or more but less than 0.05 mass %.

11. The glass substrate for a display as recited in claim 1, wherein the glass has a density of 2.49 g/$cm^3$ or less.

12. The glass substrate for a display as recited in claim 1, wherein the glass has a linear thermal expansion coefficient of 28×$10^{-7}$ to 39×$10^{-7}$/° C. at a temperature between 50° C. and 300° C.

13. A display having the glass substrate for a display as recited in claim 1.

14. The display of claim 13, which is a liquid crystal display.

* * * * *